(12) United States Patent
Loosveld et al.

(10) Patent No.: US 9,179,641 B2
(45) Date of Patent: Nov. 10, 2015

(54) LOOSE-HOUSE BARN WITH FLOOR HEATING

(71) Applicant: Lely Patent N.V., Maassluis (NL)

(72) Inventors: Serge Louis Loosveld, Maasland (NL); Aart van 't Land, Beit Hashitta (IL); Marc Havermans, Moerdijk (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 13/710,507

(22) Filed: Dec. 11, 2012

(65) Prior Publication Data

US 2013/0098306 A1 Apr. 25, 2013

Related U.S. Application Data

(63) Continuation of application No. PCT/NL2011/000049, filed on Jun. 15, 2011.

(30) Foreign Application Priority Data

Jun. 28, 2010 (NL) .................................... 1038071
Nov. 12, 2010 (NL) .................................... 1038381

(51) Int. Cl.
*A01K 1/12* (2006.01)
*A01K 1/00* (2006.01)
*A01K 1/015* (2006.01)
*A01K 1/01* (2006.01)

(52) U.S. Cl.
CPC .................. *A01K 1/0076* (2013.01); *A01K 1/00* (2013.01); *A01K 1/01* (2013.01); *A01K 1/0158* (2013.01)

(58) Field of Classification Search
CPC ........... A01J 5/00; A01K 1/01; A01K 1/0103; A01K 1/015; A01K 1/0151; A01K 1/0158; A01K 1/12

USPC ........ 119/14.01, 14.03, 14.18, 416, 436, 448, 119/450, 520, 525, 527, 529, 530, 518
IPC .................................................. A01K 1/01,1/12
See application file for complete search history.

(56) References Cited

U.S. PATENT DOCUMENTS 3,556,055 A * 1/1971 Wenger .......................... 119/436
3,677,229 A * 7/1972 Blough et al. ................. 119/448

(Continued)

FOREIGN PATENT DOCUMENTS

| EP | 635206 A1 * | 1/1995 | ............... A01K 1/01 |
|---|---|---|---|
| GB | 880638 A | 10/1961 | |
| NL | 1005918 C2 | 1/1999 | |
| NL | 1021088 C2 | 3/2004 | |
| WO | 2004007633 A1 | 1/2004 | |
| WO | 2008097080 A1 | 8/2008 | |

OTHER PUBLICATIONS

Spaans N. et al.: "Grensverleggend huisvesten van melkvee", Oct. 1, 2009, Zoetermeer (NL).
Smits, M.C.J. ; Aarnink, A.J.A., Verdamping uit ligbodems van vrijloopstallen : oriënterende modelberekeningen // Water evaporation from bedding in dairy cattle freestall barns : model approach; Rapport / Animal Sciences Group; Wageningen : Animal Sciences Group, Wageningen UR, May 1, 2009; (ISSN 1570-8616 ; 230).
International Search Report issued on Aug. 4, 2011.
International Preliminary Report on Patentability issued on Dec. 28, 2012.

*Primary Examiner* — Lisa Tsang
(74) *Attorney, Agent, or Firm* — Hoyng Monegier LLP; Minerva Rivero; David P. Owen

(57) ABSTRACT

A barn in which dairy animals can freely move about, lie down and eat includes a floor, a light-transmitting roof construction, and a wall construction. The floor consists for the greater part of a moisture absorbing, pourable layer which is able to collect moisture from manure and urine. This moisture is removed by means of solar heat and wind drying, and if this is not sufficient, by means of a floor heating. There is thus only required a very limited stationary sub-floor with a manure collecting device, i.e. only below the milking implement.

13 Claims, 1 Drawing Sheet

(56) References Cited

U.S. PATENT DOCUMENTS

| | | | |
|---|---|---|---|
| 4,224,900 A * | 9/1980 | Truhan | 119/448 |
| 5,195,455 A * | 3/1993 | van der Lely et al. | 119/14.03 |
| 5,666,905 A * | 9/1997 | Mackin et al. | 119/448 |
| 6,079,433 A | 6/2000 | Saarem | |
| 6,698,383 B1 * | 3/2004 | Terwort et al. | 119/451 |
| 8,181,604 B1 * | 5/2012 | Avila | 119/448 |
| 2004/0182586 A1 | 9/2004 | Dowdy | |
| 2009/0038552 A1 * | 2/2009 | Baker et al. | 119/14.03 |
| 2010/0012040 A1 * | 1/2010 | Pow et al. | 119/14.03 |

\* cited by examiner

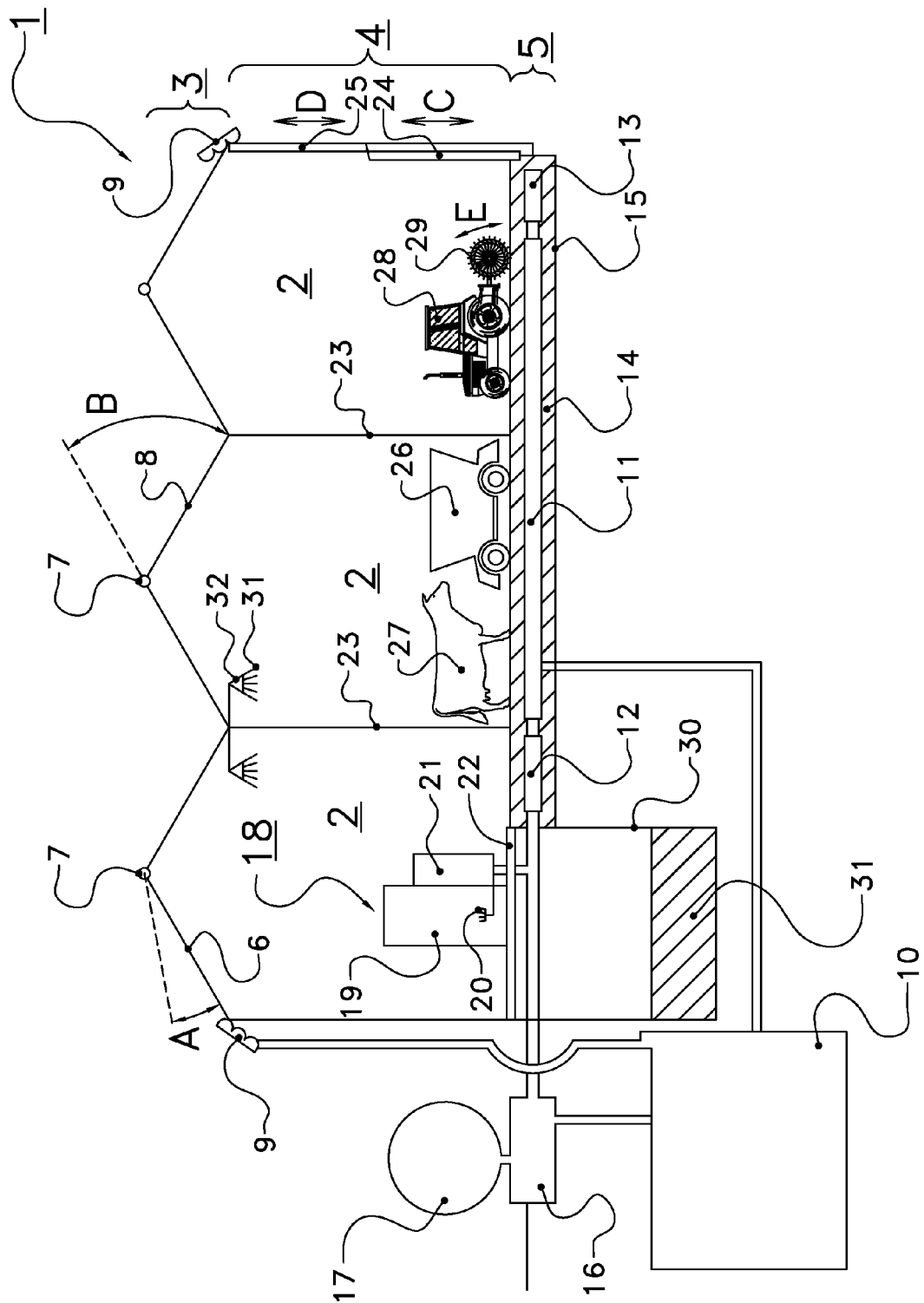

LOOSE-HOUSE BARN WITH FLOOR HEATING

CROSS REFERENCE TO RELATED APPLICATIONS

This application is a continuation of PCT application number PCT/NL2011/000049 filed on 15 Jun. 2011, which claims priority from Netherlands application number 1038071 filed on 28 Jun. 2010, as well as from Netherlands application number 1038381 filed on 12 Nov. 2010. All applications are hereby incorporated by reference in their entireties.

BACKGROUND OF THE INVENTION

1. Field of the Invention

The invention relates to a dairy animal loose-housing barn for keeping dairy animals, and to a method of keeping animals in such a barn.

2. Description of the Related Art

In particular, the invention relates to a dairy animal loose-housing barn for keeping dairy animals, comprising a space where the dairy animals can freely move about and lie down, a light-transmitting roof construction above the space, a wall construction, controllable ventilation means, a floor below the space, comprising a liquid-tight lower layer with, provided thereon, a pourable layer of a moisture absorbing material having a thickness of at least 20 cm, and at least one milking implement on a stationary sub-floor.

From the publication "Grensverleggend huisvesten van vee" ("Accommodating cattle in a ground-breaking manner"), various barn designs are known which comprise all sorts of aspects of the above-mentioned barn, such as a barn having a space where the dairy animals can move about freely, a roof construction and a wall construction, and a milking robot.

In particular, one of the treated aspects is a loose-housing barn comprising a floor, in which case manure and urine produced by the dairy animals are not removed regularly, but are air-dried and are regularly dug in. The dried manure, whether or not partially composted, serves as a ground for the dairy animals. This principle is already applied in loose-housing barns in, for example, Israel, as known from the report "Verdamping uit ligbodems van vrijloopstallen" ("Evaporation from lying grounds of loose-housing barns"), ASG report No. 230 (May 2009).

A disadvantage of this known loose-housing barn, as mentioned in the above-mentioned report, is that the manure in such barns probably dries insufficiently under Dutch climate conditions. This could have all sorts of negative results for the dairy animals, such as strong(er) contamination of the animals, and consequently of the milk, more diseases, claw problems and the like, etcetera.

BRIEF SUMMARY OF THE INVENTION

It is an object of the present invention to provide a barn of the described type which has not, or to a limited extent, said drawback, at least to provide a usable alternative.

This object is achieved by a dairy animal loose-housing barn for keeping dairy animal, comprising: a space where the dairy animals can freely move about and lie down, a light-transmitting roof construction above the space; a wall construction, controllable ventilation mechanism; a floor below the space, comprising a liquid-tight lower layer with, provided thereon; a pourable layer of a moisture absorbing material having a thickness of at least 20 cm; at least one milking implement on a stationary sub-floor with a manure collecting device, wherein the floor is provided with a floor heating system. In this barn, the floor is provided with a floor heating system. According to the inventor, it can thus be ensured that the drying, which takes place under the influence of the sun and natural ventilation, is sufficiently supported to provide a loose-housing barn which is usable throughout the year under Dutch climate conditions. In this case, by dairy animals are meant cows as well as goats, buffalos, etcetera. The at least one milking implement is advantageously an automatic milking implement (milking robot) because, for such an implement, less supervision, such as for removing manure, is even more important. For the sake of convenience, the term 'milking robot' will often be used hereinafter. However, this term can in each case also relate to (at least) a conventional milking implement, such as for example a milking carrousel or a herringbone arrangement of conventional milking stalls.

It is emphasized here that the bottom, or floor, in the loose-housing barn according to the invention comprises a top layer of a pourable, moisture absorbing material having a thickness of at least 20 cm, provided on a liquid-tight lower layer. It should be noted that, in this case, 'pourable' means that the material is permanently pourable, and is for example not a material like concrete which, of course, is originally also poured. Laws and rules require that no manure moisture or urine can get into the groundwater, although a completely unrestricted bottom layer would be ideal. The bottom layer is, for example, made of concrete, or of plastic or metal sheets or the like, but preferably of plastic film. This bottom layer, as a whole, can be laid in a simpler manner, causes less environmental pollution, and heats up more quickly, if desired.

The top layer may for example be made of compost, sand, clay, dried manure or the like, or a mixture thereof. Advantageously, a layer of sand, (very) fine gravel, compost or a mixture thereof, is provided directly on the bottom layer. On top thereof, a layer of compost, dried manure or the like can be poured as a basic layer. This lower layer should preferably be well moisture absorbing and preferably be organic. It is also possible to produce both the lower layer and the top layer solely of organic material. In particular, as an organic layer, a layer of compost is used, in which case the lower compost layer consists of relatively finely sieved compost having a relatively high sand fraction, and the upper compost layer consists of relatively coarser compost, such as the coarser wood fraction. This offers the advantage of a lighter upper layer, which can be kept dry in a simpler manner, and results in cleaner dairy animals. "Relatively" relates in this case to a comparison of the two layers. It should be noted that the layers can also pass gradually into each other.

The longer the barn is used, the more manure will be added and the more this top layer will consist of (subsequently) dried manure. This type of loose-housing barn is not only intended to provide a pleasant floor material for the dairy animals. For example, dried manure is found in practice to result in much fewer claw problems than a concrete or grid floor. This type of floor material will also contribute to a reduced ammonia emission. This is due to the effect that urine and manure, at least the wet and dry components, are quickly separated. This will result in a reduced conversion of nitrogen compounds in the manure to ammonia. Moreover, temperature plays a role in said process. Therefore, the floor heating system advantageously comprises a temperature regulation unit which is adapted to keep the temperature in the floor within a predetermined temperature range, advantageously below 40° C., more advantageously between 15° C. and 40° C.

In an advantageous embodiment, the floor heating comprises a network of hoses through which flows a, preferably temperature regulated, medium, such as water. The network comprises for example hoses, and is located for example on the bottom floor, of film or the like, in a sand bed. This offers the advantage of a high heat capacity, so that the layer (sand) can act well as a heat buffer. The floor heating is advantageously at a sufficient depth, in particular at a depth of more than 0.5 meter, advantageously at a depth between 1 and 1.5 meter.

It is pointed out that the principle of floor heating is known per se for extra bottom heat in, for example, barns for young animals. However, in this case said floor heating is usually incorporated in a concrete floor or other stationary floor, and serves a completely different purpose. Incorporation in a loose-housing barn is not known therefrom.

Here, by "loose-housing barn" is meant, as is customary, a barn where the dairy animals can in principle move about freely in substantially the whole space. This already results in that the manure can in principle be deposited in substantially the whole space, so that the required drying is no longer limited to one or a few places. This in contrast with, for example, cubicle stalls or even tie stalls. In these stalls, there is an intended lying area (the cubicles), or the dairy animals are continuously present at fixed positions, respectively. In both cases, in particular of course in the latter case, the manure will concentrate on a proportionally very small surface, and drying will in all cases be insufficient. This means that a grid floor, daily manure removing or comparable measures should be provided in these cases. In the barn according to the present invention, the space is substantially free from cubicles, i.e. the number of cubicles is less than half, preferably less than one tenth, of the intended number of dairy animals for the barn.

It is further pointed out that much manure is secreted during eating of the dairy animals. In a very large number of cases, concentrate will be metered and consumed in the milking robot. Therefore, many dairy animals will produce manure during said eating, and anyhow during the temporary confinement in the milking robot during the milking run. In and immediately around the milking robot there will thus be deposited more manure than can be dried under more or less normal circumstances. A stationary sub-floor with a manure collecting device will thus be provided below the milking robot. The sub-floor is in particular a grid floor or a concrete floor that is liquid-permeable in another manner.

Another place where, in customary cubicle stalls, much manure is deposited locally, is in the vicinity of a feed fence or other fixed eating place. In order to prevent such manure accumulations, in the barn according to the invention there are provided mobile feeding systems, such as feed wagons. These can, for example, be moved one or a few times per day. Advantageously, there are provided self-propelled feed wagons, so that an optimum manure distribution can be achieved. This also results in that a grid floor with an associated manure collecting device is not required in the vicinity of a feed fence, because the latter is not provided. In a particular embodiment, the floor, at least in said space and outside the sub-floor below the at least one milking robot, is free from concrete and/or free from grid parts. This construction is not only much cheaper and easier to provide, but additionally easier to remove.

The light-transmitting roof construction plays an important part. This roof construction preferably comprises a light-transmitting construction material, such as glass or sheets of transparent plastic material, or light-transmitting film, and then in each case over substantially the whole surface. The light-transmitting film is preferably clear, transparent plastic film and preferably covers the entire roof with the exception of the roof part through which the sun could shine on the milking robot. In order to prevent the animals present in the milking robot from being hindered by direct sunlight, the film at that location is advantageously translucent or even substantially non-transparent, for example white. Alternatively or additionally, the roof construction can advantageously be provided with operable shading means, such as shade cloth, lamellas or roller blinds.

The roof construction preferably comprises controllable ventilation means (e.g. ventilation mechanism), in the form of roofing sheets which are advantageously pivotable in the ridge. It is thus possible, for example, to capture wind, or, at low temperatures, to suck air from the space by opening a sheet at the lee side. Moreover, at times of not very heavy rainfall, the pivoting motion in the ridge can also prevent the rain from falling directly into the construction during aeration.

The wall construction advantageously comprises controllable ventilation means, in particular comprising vertically displaceable wall portions, so that the flow of outside air is controllable. In this case, inter alia the outside temperature, air humidity and wind speed are advantageously taken into account. In particular, the wall construction comprises an upwardly opening wall portion and a downwardly opening wall portion, it being possible for these wall portions to be one and the same and thus to have a double function. This makes it possible to ensure that, for example when the outside temperature is sufficiently high, the outside air will be led directly from outside over the floor and will dry the floor from its outermost edge. When the outside temperature is too low, a direct air flow on—in particular lying—dairy animals is undesirable, and an indirect air flow from above, consequently in the case of a wall construction whose upper part is open, is preferred. This results in that the outermost edges of the floor will dry with more difficulty. Therefore, in a particular embodiment, the floor heating system has a heating capacity which, near the wall construction, is larger than an average heating capacity as determined for the entire floor. This lower drying capacity is thus compensated.

Near the stationary sub-floor below the milking robot, at least at the transition of the floor in the space to said stationary sub-floor, there is often frequent cow traffic, and an increased deposit of manure. In order to have sufficient drying capacity, also in that region of the floor, in a particular embodiment, the floor heating system has a heating capacity which, near the stationary sub-floor below the milking robot, at least at the transition of the floor in the space to said stationary sub-floor, is larger than an average heating capacity as determined for the entire floor.

In embodiments, the floor heating system comprises an energy storage system, in particular in the form of a bottom heat storage or thermo-chemical heat storage, such as for example known from NL 1021088, which is hereby incorporated by reference in its entirety. In the case of thermo-chemical heat storage, heat can be stored in the form of reaction products from a reversible reaction, such as water in hygroscopic substances, etcetera. In order to release the heat, the reaction is caused to take place in opposite direction. Of course, simpler systems, such as insulated water tanks and the like, can also be applied. In this manner, superfluous heat can be stored for later use, such as for example heat released on a warm summer day, when sufficient wind drying takes place, but solar heat and/or heat from a composting process is still available. In winter, or for example at night, this heat can be pumped up or released otherwise, and be dissipated to the floor in order to obtain sufficient drying capacity. In particular, for use in winter of heat stored in summer, a thermochemical storage is suitable, because in this case no temperature difference is required, and in this manner energy can be stored during an in principle unlimited period of time (substantially) without losses.

The floor heating system advantageously comprises a heat supplying means (e.g., heat supplying mechanism) in the form of at least one of a milk cooling residual heat supply operatively connected to the at least one milking robot and a solar collector. The milking implement has to cool the milk from ±37° C. to a few degrees above zero, in which case much heat is released, which can thus be used efficiently. Solar collectors are useful to collect superfluous heat, in particular in summer, and in this application incidentally also comprise solar boilers and comparable equipment. In addition, burners, electric boilers and conventional heating devices of this kind may, of course, be used.

The barn according to the invention advantageously comprises a moisture supplying means (e.g., moisture supplying mechanism) configured to supply moisture to the floor, in particular a water spraying or water atomizing device, and more in particular a controllable moisture supplying means. It is thus possible in an efficient manner to prevent the floor from becoming too dry and/or to prevent the formation of dust. If the floor becomes too dry, a possibly desired composting process will be counteracted, while the formation of dust may unintentionally cause health problems or contaminations.

In embodiments, the barn according to the invention comprises a control device configured to control the ventilation means and/or the floor heating system. In this case, the control device is advantageously coupled to one or more climate sensors, such as a thermometer for outside temperature and/or inside temperature and/or barn floor temperature, and/or an air humidity meter and/or a wind speed meter and/or an insolation meter and/or a barn floor humidity sensor. In this manner, the control device can control, on the basis of the data obtained, an optimum setting of the ventilation means and/or the floor heating system, in particular in order to keep the degree of humidity of the floor at a desired level. The control device is advantageously coupled to other devices which influence said degree of humidity, such as operable shading means and/or controllable moisture supplying means. In particular, the floor heating system is locally controllable, i.e. as a function of the location. For, it may occur that some places remain wetter than other places, and will therefore require a different drying capacity, in particular a different floor heating capacity. For example, there may be provided a system of valves which are controllable by the control device and which control the supply of hot water, or another drying energy carrying medium, as a function of the locale desired drying. Thermostatically controlled taps may also be taken into consideration.

Such wetter places may, for example, also be determined by experience, or by the user who, for example, makes a daily tour and observes the wetter places. The control device advantageously comprises a network of a plurality, such as at least 10, of barn floor humidity sensors, and the control device is configured to control the floor heating system locally on the basis of the local barn floor humidity as measured by the barn floor humidity sensors. The available heating can thus optimally be used to keep the pourable layer of the barn floor dry. In this case, the barn floor can, for example, be subdivided into segments.

The sensors may, for example, be hygrometers, such as also used in plant and vegetable breeding. It is also possible to measure or estimate the humidity of the pourable layer, at least the upper part thereof, in a contactless manner, such as by means of infrared sensors in the upper part of the barn, described in inter alia U.S. Pat. No. 6,079,433, which is hereby incorporated by reference in its entirety, or by means of a camera system that reacts on the colour of the top layer.

The invention also relates to a method of keeping animals in a barn according to the invention and in which the method comprises collecting manure from the dairy animals on the floor and drying the collected manure on the floor, wherein the step of drying the collected manure comprises drying the manure in a forced manner with the aid of a floor heating in the floor. The advantages occurring in this case are of course the same as in the above-described barn. Also the particular embodiments of the barn offer corresponding advantages in the method and will therefore be deemed to be implicitly incorporated.

The method comprises in particular rooting up at least the upper layer of the moisture absorbing material. This improves the moisture absorbing capacity of that layer. In particular, if the upper layer becomes extra dry, for example by much insolation, drying air and/or little manure and urine supply, said layer will, without further treatment, also become hard and somewhat water-repellent, at least have a reduced moisture absorbing capacity. By processing the top layer, the latter will not only "break" and consequently have per se a better moisture absorbing capacity, but it is also possible to mix the less moisture absorbing top layer with parts of the better moisture absorbing layer located therebelow.

This takes place, for example, by means of a spading machine. Advantageously, the layer is aerated and/or dug in by means of an auger comprising rotatable pins that penetrate into the ground. By their rotating action, these pins do not compact the layer, in particular do not compact the layer below the loosened layer. Moreover, a rotating auger is able to bring up parts of the lower layer and thus to mix them with the top layer. Such an auger also requires less energy than a spading machine, and can in principle work at the same capacity to a greater depth, even to a double depth, such as for example 40 cm instead of 20 cm.

There is also provided a method of storing round bales, i.e. cylindrical bales of hay or the like, which are compressed in a baler. Such round bales are often stacked. In practice, it is frequently found that such stacks, at least partially, fall down unintentionally. The invention provides a solution for this problem by stacking the bales on a ground which extends obliquely upwards to some extent, in particular in a U shape or V shape, towards two opposite sides. As a result thereof, the bales will sag towards each other and either no longer fall down, or fall down on each other, which is not dangerous for persons present in the vicinity of the stack.

BRIEF DESCRIPTION OF THE DRAWINGS

The features and advantages of the invention will be appreciated upon reference to the following drawings, in which:

FIG. 1 shows a diagrammatic cross-section, not drawn to scale, of a barn according to the invention.

DESCRIPTION OF ILLUSTRATIVE EMBODIMENTS

The following is a description of certain embodiments of the invention, given by way of example only and with reference to the drawings. FIG. 1 shows in a diagrammatic cross-section, not drawn to scale, a barn 1 according to the invention. Said barn comprises a space 2 where dairy animals 27, such as cows or goats, can move about freely, lie down and eat, and a roof construction generally denoted by numeral 3, a wall construction denoted by numeral 4, and a floor denoted by numeral 5.

In the roof construction 3, by 6 is denoted a first sheet which can pivot, in the direction of arrows A, in the ridge 7. A second sheet 8 can pivot in the direction of arrows B in the ridge 7. By 9 are denoted solar collectors which can store hot water in tank 10.

By 11 is denoted a floor heating having a first hotter portion 12 and a second hotter portion 13. The floor heating 11, 12, 13 is located in a pourable layer 14 on a film 15.

By 18 is denoted a milking implement, here a milking robot with a box 19, teat cups 20 and a control 21, which milking implement 18 is disposed on a grid floor 22 above a manure collecting device 30 with manure 31, and which stores its milk, via a heat exchanger/cooling device 16, in the milk tank 17.

By 23 are denoted roof carrying beams, and by 24, 25 are denoted lower wall portions, upper wall portions, respectively, which can move in the direction of arrows C, arrows D, respectively.

There are further provided a mobile feed wagon 26, a vehicle 28 having a spading machine 29 rotatable in the direction of arrows E and a sprinkler installation 32 for spraying water 33.

In the barn 1, the space 2 is an integral whole. However, there may also be parts, whether or not temporarily screened off, such as for calving cows and cows having calves.

In this case, the roof construction 3 has a greenhouse roof shape, having three peaks, although any other number is also possible, like in principle all other roof shapes, such as pagoda roofs or pavilion roofs are possible. The roof comprises sheets which are pivotable in the respective ridges 7. As a result thereof, at a sufficiently small opening angle, the sheets will slightly overlap the opposite sheets, so that, for example in the case of rain, it is indeed possible to aerate without rain entering the barn. A first sheet 6 can, for example, be opened in the case of light wind from the side which is the left one in the drawing or in the case of stronger wind from the side which is the right one in the drawing, while the second sheet 8 can be opened in the case of reverse wind direction and reverse wind force. The sheets comprise light-transmitting construction material, such as plastic film or sheet, or glass. The material is preferably UV resistant or UV transmitting. A shading means which, in the case of too much insolation, can be used to provide a part of the space, in particular the floor 5, with shade, is not shown. The shading means may, for example, comprise a controllable shade screen or roller blind which can be controlled by means of a control device on the basis of weather conditions such as temperature and air humidity. The required sensors are not shown here. It can thus be prevented in an efficient manner that said floor dries up too much. An insolation reducing means may also be applied above the milking implement, which is explained below in more detail.

The optional solar collectors 9 collect solar heat, as far as available, for the purpose of heating water or another fluid, which heated fluid can be stored in an also optional, whether or not subterranean and whether or not insulated tank 10. Alternatively, with the aid of a heat exchanger (not shown), this heat can also be used to evaporate a salt solution or otherwise to store the energy in a thermo-chemical manner. For all this, a tank 10 will also frequently be used.

The optional tank 10 may be connected to the floor heating 11 which is mounted in the floor 5 of the barn 1. The floor comprises a liquid-tight lower layer 15, such as a layer of a solid film, or a floor of concrete or stone. On said floor there is provided a pourable top layer 14, consisting of a lower layer of sand and thereabove a layer of compost and/or manure having a thickness of at least 20 cm. The total layer of sand plus compost/manure can easily amount to 80 cm or more. This provides amply sufficient moisture storage capacity to be able to dry the manure from the dairy animals 27 in an efficient manner.

The floor heating 11 has a first hotter portion 12 and a second hotter portion 13. In this case, "hotter portion" means a portion having a larger heating (or if desired also cooling) capacity, such as having a higher density of fluid lines. The portion 12 is provided near the transition of the grid floor 22, and the portion 13 is provided near the wall construction 4. The advantages are described below in more detail.

Here, the wall construction 4 comprises a lower wall portion 24 and an upper wall portion 25, which are both movable or slidable one into the other. The wall portion 24 can then open the side wall, for example at its lower side, to allow wind to blow directly over the floor 5 and make it dry. The wall portion 25 can open the wall construction at its upper side, for example in the case of a cold wind. As a result thereof, in particular lying cows are better protected against direct cold wind. Of course, the wall portions 24, 25 can also be designed in such a manner that a passage to a pasture or the like can be provided.

The pourable layer 14 can be rooted up and aerated by means of the spading machine 29 behind the vehicle 28. This promotes the drying, the digging in of manure in order to reduce contamination of the dairy animals, and possibly to promote the converting of manure to compost. It will suffice to perform these actions a few times per day. Here, the vehicle 28 is a tractor. Alternatively, self-propelled vehicles may also be provided, and the spading machine 29 may also be replaced by, for example, a cultivator, a cutter or the like. Alternatively or additionally, aeration means may also be mounted in the floor 5, in particular in the top layer 14, such as one or more lines having apertures through which air can be blown.

The sprinkler installation 32 is configured to spray water 33 or to atomize it in the space 2 when the layer 14 threatens to become too dry. This may be the case if there is much insolation and dry outside air during a longer period of time. The sprinkler installation 32 might constitute part of a fire protection comprising, for example, a pinching device to limit the passage of water. It may also be a completely independent installation, and it may also be able to atomize in order further to enhance the comfort for the dairy animals 27.

By 26 is denoted a mobile feed wagon from which the dairy animals can consume feed. When eating, the dairy animals 27 will deposit relatively much manure. The feed wagon 26 is mobile, at least movable, in order to prevent the manure from being deposited too locally, such as at a feed alley, and from thus constituting a too large moisture load for the layer 14. The feed wagon 26 is advantageously autonomously movable, like a self-propelled wagon. It can thus be optimally ensured that, at least during eating, the deposited manure is spread as much as possible over the floor 5. Any desired number of feed wagons 26 may be provided, the number depending on the number of animals to be fed and the dimensions of the feed wagons 26. A larger number of wagons 26 provides a better spreading of the manure, and enables the dairy animals to eat relatively undisturbed. The feed wagons may also be used to lead the dairy animals to some extent to specific desired places. It is also possible, for example, to lead the feed wagons outside, to a pasture, or to avoid relatively humid places and to seek out dry places. It is thus possible still further to improve the water balance of the layer 14. The water balance may, for example, be monitored with the aid of moisture sensors which are not shown here. These may, for example, be mounted in the floor 5, advantageously in the top layer 14, and measure there the degree of humidity directly. Alternatively or additionally, the humidity may be monitored by one or more cameras suitable therefor. The measurement data from the sensors and/or cameras can be used by a control of the feed wagon(s) 26 to control said wagon(s).

Here, the shown milking implement 18 is a milking robot, shown very diagrammatically as four teat cups 20 in a box 19 having a control 21. Since a dairy animal 27 will in each case stand still for a while in the milking implement 18 and, in many cases, concentrate will also be dispensed in the milking implement 18, there will be an increased deposit of manure on the spot. For this reason, and because the milking implement 18 requires of course a solid ground, it is disposed on a hard ground, in particular a concrete floor, part of which consists of a grid floor 22. Alternatively, the concrete floor may also be equipped with a liquid discharge. Manure or manure moisture 31 is collected in the manure collecting device 30 which is, for example, partially located below the grid floor. If desired, a heat exchanger may also be connected to the manure collecting device 30, in order to collect residual heat from manure or manure moisture.

Instead of a milking robot, any other milking implement may be provided as a milking implement, such as a multiple barn or carrousel in which dairy animals can be milked whether or not conventionally. The size of the hard sub-floor/grid floor can be adapted accordingly. It is pointed out that this sub-floor/grid floor is very advantageously the only hard sub-floor in the entire barn dairy animals come directly into contact with. This means that a hard sub-floor of the floor 5, consequently instead of the film 15, is possible, but that as a top layer the concrete floor/grid floor is only present below the milking implement 18. This results in that the use of material for the barn 1, as a whole, and consequently the costs, can be considerably limited. It should be noted that the barn has no separate cubicles, so that neither stationary constructions, nor a special manure collecting device are needed there, because the dairy animals will not rest and deposit manure at fixed positions.

In the barn 1 according to the invention, there are provided a number of controls, such as the control 21 of the milking implement 18, as well as non-shown controls for the ventilation means 6, 8, 24, 25, for shading means, for the sprinkler installation 32 and for the floor heating 11. These may be provided each separately, or be combined in one or more groups. A sole total control offers the advantage that all controllable parts of the barn 1 can be controlled in a mutually attuned manner. Optimal conditions can thus be created for a barn 1 having a floor 5 of which the moisture absorbing, pourable layer 14 is able to dry the manure and urine falling on it sufficiently and sufficiently quickly, so that the thus dried solid manure can become part of the same layer 14. It is then no longer possible frequently to remove the layer 14 and to replace it by a fresh ground for the dairy animals 27. For example, in practice it will be possible to remove and refresh the layer 14 at least partially only twice a year, or even less often. Said layer can, incidentally, be commercialized very well as compost and/or dried manure, and is very suitable for use as a soil improving means or as a manure.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A dairy animal loose-housing barn for keeping dairy animals, comprising
   a space where the dairy animals can freely move about and lie down,
   a light-transmitting roof construction above the space,
   a wall construction,
   controllable ventilation mechanism,
   a floor below the space, the floor comprising a bottom liquid-tight lower layer with, provided thereon, a top layer comprising a lower pourable layer of a moisture absorbing material having a thickness of at least 20 centimeters and an upper layer of at least one of compost and manure, and
   one or more milking implements on a stationary sub-floor, the stationary sub-floor having a manure collecting device, wherein a grid or concrete floor is only present below the one or more milking implements,
wherein a floor heating system is provided in the top layer of the floor;
   wherein the floor heating system has a heating capacity which, near at least one of: the wall construction,
   and the stationary sub-floor below the milking implement, at least at the transition of the floor in the space to said stationary sub-floor,
is larger than an average heating capacity as determined for the entire floor.

2. The barn according to claim 1, wherein the energy storage system comprises a thermo-chemical heat storage.

3. The barn according to claim 1, wherein the floor heating system comprises a heat supplying mechanism that comprises at least one of a milk cooling residual heat supply operatively connected to the at least one milking implement, and a solar collector.

4. The barn according to claim 1, comprising a moisture supplying mechanism configured to supply moisture to the floor.

5. The barn according to claim 4, wherein the moisture supplying mechanism is a water spraying or water atomizing device.

6. The barn according to claim 1, wherein the floor, at least in said space and outside the sub-floor below the at least one milking implement, is free from grid elements.

7. The barn according to claim 1, provided with at least one movable feeding system for the dairy animals.

8. The barn according to claim 7, wherein the movable feeding system is a self-propelled feeding system.

9. The barn according to claim 1, wherein said space is substantially free from cubicles.

10. The barn according to claim 1, comprising a control device configured to control at least one of: the ventilation mechanism and the floor heating system.

11. The barn according to claim 10, wherein the floor heating system is locally controllable.

12. The barn according to claim 10, wherein the control device comprises a network of a plurality of barn floor humidity sensors, and wherein the control device is configured to control the floor heating system locally on the basis of a local barn floor humidity as measured by the barn floor humidity sensors.

13. The barn according to claim 1, wherein the floor heating system comprises an energy storage system.

* * * * *